US008169469B2

(12) United States Patent
Miyake et al.

(10) Patent No.: US 8,169,469 B2
(45) Date of Patent: May 1, 2012

(54) INFORMATION PROCESSING DEVICE, INFORMATION PROCESSING METHOD AND COMPUTER READABLE MEDIUM

(75) Inventors: Hiroyuki Miyake, Kanagawa (JP); Tetsuo Iyoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 882 days.

(21) Appl. No.: 12/242,949

(22) Filed: Oct. 1, 2008

(65) Prior Publication Data
US 2009/0185031 A1    Jul. 23, 2009

(30) Foreign Application Priority Data

Jan. 17, 2008 (JP) .................................. 2008-008565

(51) Int. Cl.
*H04N 9/47* (2006.01)
(52) U.S. Cl. ......................................................... 348/61
(58) Field of Classification Search ....................... 348/61
See application file for complete search history.

(56) References Cited

U.S. PATENT DOCUMENTS

| 5,568,279 | A  | * | 10/1996 | Hinman et al. | ............... | 358/452 |
| 7,679,643 | B2 | * | 3/2010 | Shingu | ...................... | 348/207.11 |
| 2003/0210244 | A1 | * | 11/2003 | Sasago et al. | ................. | 345/419 |
| 2004/0070674 | A1 | * | 4/2004 | Foote et al. | ............. | 348/207.99 |
| 2006/0284985 | A1 | * | 12/2006 | Tokai | ....................... | 348/211.99 |
| 2008/0068562 | A1 | * | 3/2008 | Hirata | .............................. | 353/25 |
| 2009/0097755 | A1 | * | 4/2009 | Shingu et al. | ................. | 382/190 |
| 2009/0185031 | A1 | * | 7/2009 | Miyake et al. | .................. | 348/61 |
| 2009/0284757 | A1 | * | 11/2009 | Mayer et al. | .................. | 356/602 |
| 2010/0123687 | A1 | * | 5/2010 | Nagamine | ..................... | 345/179 |

FOREIGN PATENT DOCUMENTS

JP   2005-033756 A   2/2005

\* cited by examiner

*Primary Examiner* — Jerry Dennison
(74) *Attorney, Agent, or Firm* — Sughrue Mion, PLLC

(57) ABSTRACT

An information processing device that is connected to a projecting device that projects an annotation image input from an external terminal onto a projection region including an object, and is connected to an image capturing device that captures an image of the projection region. The information processing device obtains image data to be input to and output from the projecting device and the image capturing device through a communication with the external terminal. The information processing device includes: a memory that stores a database including CAD data to be used for designing the object, and the attribute information of the CAD data; an acquiring unit that acquires the identification information of the object; an identifying unit that identifies the CAD data of the object included in the database, based on the acquired identification information of the object; and a controller that associates the data of an image captured by the image capturing device with the CAD data of the object identified by the identifying unit, and causes the memory to store the data of the captured image associated with the CAD data, so that the data of the captured image can be viewed based on the attribute information of the CAD data of the object identified by the identifying unit.

13 Claims, 12 Drawing Sheets

FIG. 4

| OBJECT ID | CAD DATA (FILE NAME) | ATTRIBUTE INFORMATION | | |
|---|---|---|---|---|
| | | TITLE | USER NAME | DATE |
| object001 | cad001 | COMPONENT A | H.M | 2006.12.2 |
| object002 | cad002 | COMPONENT B | H.M | 2007.11.21 |
| object003 | cad003 | COMPONENT C | K.Y | 2007.6.15 |
| ... | ... | ... | ... | ... |

US 8,169,469 B2

INFORMATION PROCESSING DEVICE, INFORMATION PROCESSING METHOD AND COMPUTER READABLE MEDIUM

CROSS-REFERENCE TO RELATED APPLICATION

This application is based on and claims priority under 35 USC 119 from Japanese Patent Application No. 2008-008565 filed Jan. 17, 2008.

BACKGROUND

1. Technical Field

The present invention relates to an information processing device, an information processing method and a computer readable medium.

2. Related Art

There have been known remote indication systems each including a server (a computer, for example) connected to a camera and a projector, and a remote client (a computer, for example) connected to the server via a network.

SUMMARY

According to an aspect of the invention, there is provided an information processing device that is connected to a projecting device that projects an annotation image input from an external terminal onto a projection region including an object, and is connected to an image capturing device that captures an image of the projection region. The information processing device obtains image data to be input to and output from the projecting device and the image capturing device through a communication with the external terminal. This information processing device includes: a memory that stores a database including CAD data to be used for designing the object, and the attribute information of the CAD data; an acquiring unit that acquires the identification information of the object; an identifying unit that identifies the CAD data of the object included in the database, based on the acquired identification information of the object; and a controller that associates the data of an image captured by the image capturing device with the CAD data of the object identified by the identifying unit, and causes the memory to store the data of the captured image associated with the CAD data, so that the data of the captured image can be viewed based on the attribute information of the CAD data of the object identified by the identifying unit.

BRIEF DESCRIPTION OF THE DRAWINGS

Exemplary embodiments of the present invention will be described in detail based on the following figures, wherein:

FIG. 4 shows an example of the CAD database that is stored in at least one of the memories;

DETAILED DESCRIPTION

The following is a description of exemplary embodiments of the present invention, with reference to the accompanying drawings.

First Exemplary Embodiment

Figure 1:
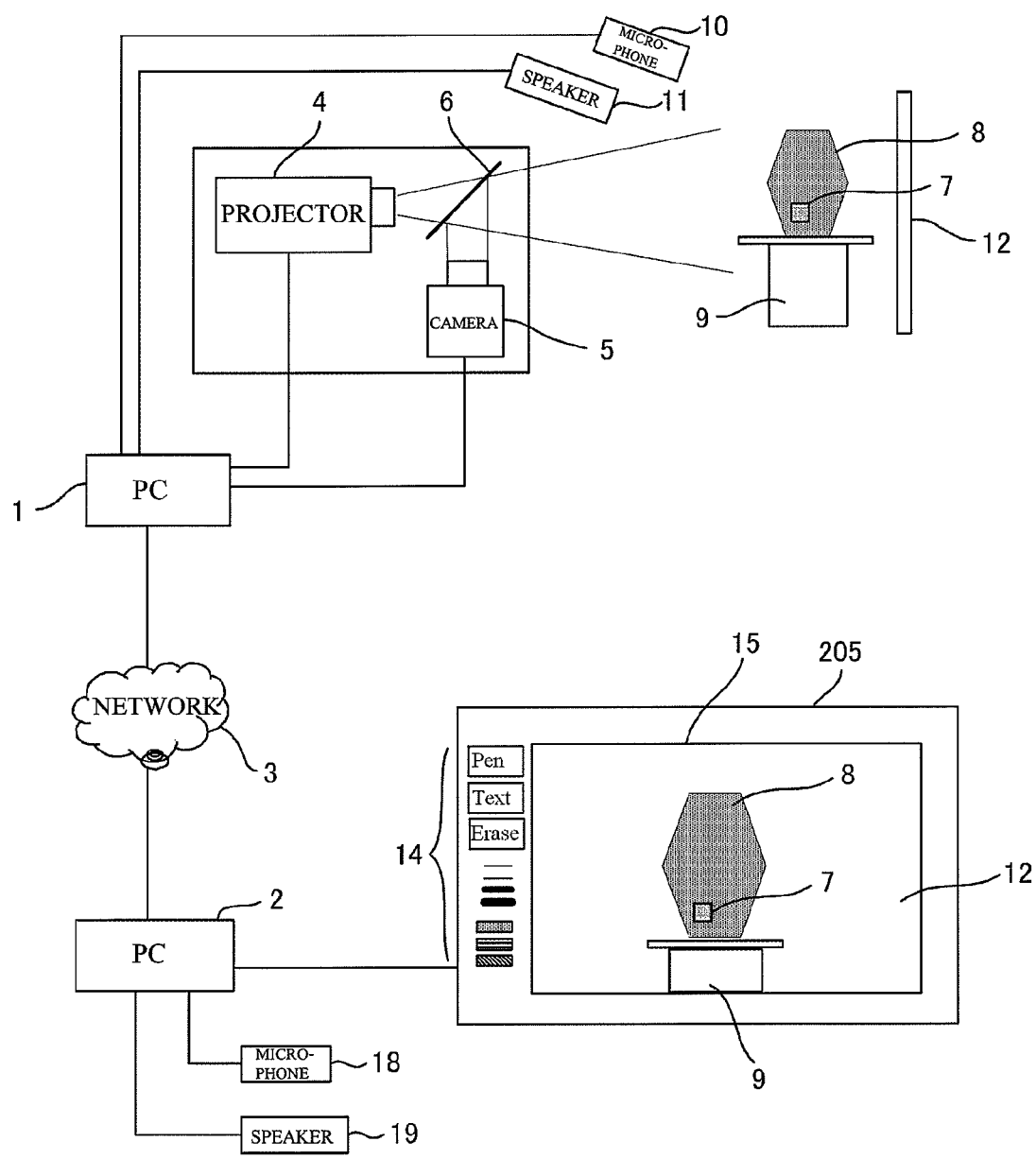
FIG. 1 is a block diagram illustrating the structure of a remote indication system in accordance with a first exemplary embodiment of the present invention.

FIG. 1 is a block diagram illustrating the structure of a remote indication system in accordance with an exemplary embodiment of the present invention.

The remote indication system of FIG. 1 includes a personal computer (PC) 1 that functions as a server, and a PC 2 (an external terminal) that functions as a client. The PC 1 and the PC 2 are connected to each other via a network 3. A projector 4 (a projecting device) and a camera 5 (an image capturing device) are connected to the PC 1.

In accordance with a control command from the PC 1, the projector 4 emits light beams or projects an annotation image or the like onto an object 8 and a screen 12 via a half mirror 6. Annotation images may include various forms of images such as lines, characters, symbols, figures, colors, and fonts.

The camera 5 is formed with a PTZ (Pan-Tilt-Zoom) camera, a network camera, or a video camera, and is placed on a table. The camera 5 captures a reflected image of the screen 12 as well as the object 8 via the half mirror 6, and outputs the captured image to the PC 1. The camera 5 captures an entire image of the object 8. The optic axis and field angle of the projector 4 are the same as the optic axis and field angle of the camera 5. The camera 5 captures a still image of the object 8 in accordance with an instruction that is input from the PC 2 or an instruction that is input directly to the PC 1, or on a regular basis (at 0.1 seconds intervals, for example). A QR code 7 including the ID (identification information) of the object 8 is attached to the surface of the object 8.

The PC 1 outputs the image captured by the camera 5 to the PC 2 via the network 3. The PC 2 is connected to a display 205, and the display 205 has a display region 15 and a user interface (UI) 14. The captured image transmitted from the PC 1 is displayed in the display region 15. The PC 2 may be a personal computer that is integrally formed with the display 205.

A microphone 10 (the (second) voice input/output device) receives a voice instruction or the like of the user of the PC 1, and outputs the voice to the speaker 19 connected to the PC 2. A speaker 11 (the (second) voice input/output device) outputs a voice instruction or the like of the user of the PC 2 that is input through a microphone 18 connected to the PC 2.

The UI 14 includes a group of buttons such as a pen button, a text button, and an erase button, and icons defined by lines and colors. The image captured by the camera 5 is displayed in the display region 15. In FIG. 1, the image of the screen 12 including the object 8 that is captured by the camera 5 is displayed in the display region 15.

For example, when the pen button of the UI 14 is pressed to draw a figure or the like on the object 8 in the display region 15, the information about the figure (more specifically, coordinates information) is output from the PC 2 to the PC 1. The PC 1 then decodes and converts the figure information (the coordinate information) to an image to be projected by the projector 4 and outputs the image to the projector 4. The projector 4 then projects the image onto the object 8.

Meanwhile, the PC 2 outputs control commands to the PC 1, so as to control operations of the projector 4 and the camera 5 (such as the image capturing angles and the brightness of images captured by the camera 5, and the brightness of images projected by the projector 4).

The microphone 18 (the first voice input/output device) receives a voice instruction or the like of the user of the PC 2, and outputs the voice to the speaker 11 connected to the PC 1. The speaker 19 (the first voice input/output device) outputs a voice instruction or the like of the user of the PC 1 that is input through the microphone 10 connected to the PC 1.

In FIG. 1, the number of clients is only one (the PC 2), but the remote indication system may include two or more clients (PCs).

In the remote indication system having the above structure, an image captured by the camera 5 is displayed on the display 205 of the PC 2, and an annotation image written on the PC 2 is projected onto the object 8 through the projector 4. Accordingly, the user of the PC 1 and the user of the PC 2 can communicate with each other with the use of the object 8 that is the real thing. The user of the PC 1 and the user of the PC 2 can also have voice communications with each other through the microphone 10, the speaker 11, the microphone 18, and the speaker 19.

Figure 2:
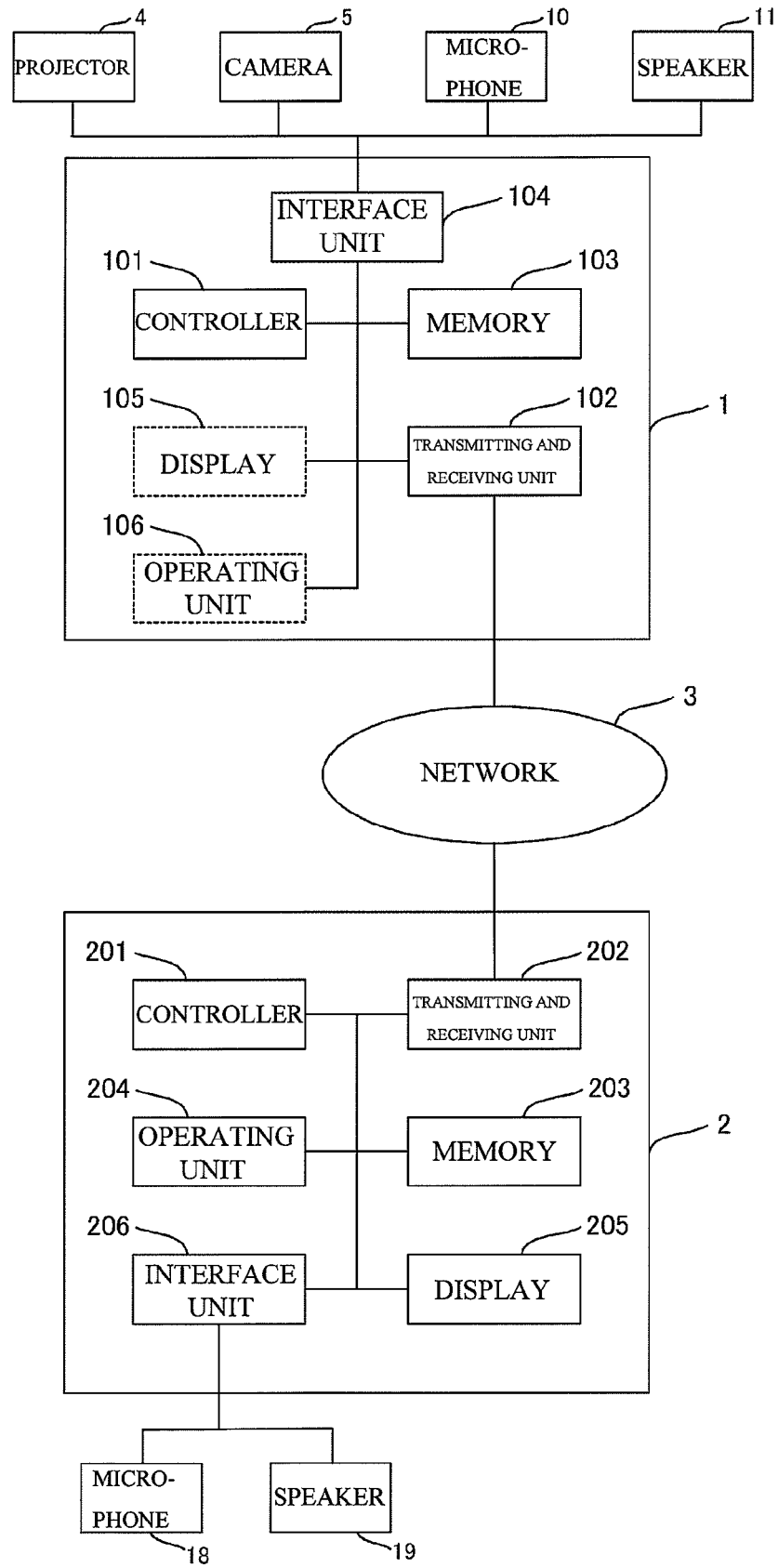
FIG. 2 is a block diagram illustrating the functional structures of the PCs.

FIG. 2 is a block diagram showing the functional structures of the PCs 1 and 2.

The PC 1 includes: a controller 101 (the acquiring unit, the identifying unit, and the controller) that controls operations of the projector 4 and the camera 5, as well as the entire device; a transmitting and receiving unit 102 that exchanges information with the PC 2 via the network 3; a memory 103 (the memory) that stores control programs, data, information, and the likes; and an interface unit 104 that is connected to the projector 4, the camera 5, the microphone 10, and the speaker 11. The PC 1 may further include a display 105 that displays a captured image, and an operating unit 106 (the input unit) that is formed with a mouse, a keyboard, and the likes. The controller 101 is connected to the transmitting and receiving unit 102, the memory 103, the interface unit 104, the display 105, and the operating unit 106. The controller 101 is further connected to the projector 4, the camera 5, the microphone 10, and the speaker 11 via the interface unit 104.

The PC 2 includes: a controller 201 (the acquiring unit, the identifying unit, and the controller) that controls the entire device; a transmitting and receiving unit 202 that exchanges data and information with the PC 1 via the network 3; a memory 203 (the memory) that stores control programs, data, information, and the likes; an operating unit 204 (the input unit) that is formed with a mouse, a keyboard, and the likes; a display 205; and an interface unit 206. The controller 201 is connected to the transmitting and receiving unit 202, the memory 203, the operating unit 204, the display 205, and the interface unit 206. The controller 201 is further connected to the microphone 18 and the speaker 19 via the interface unit 206.

Figure 3A:
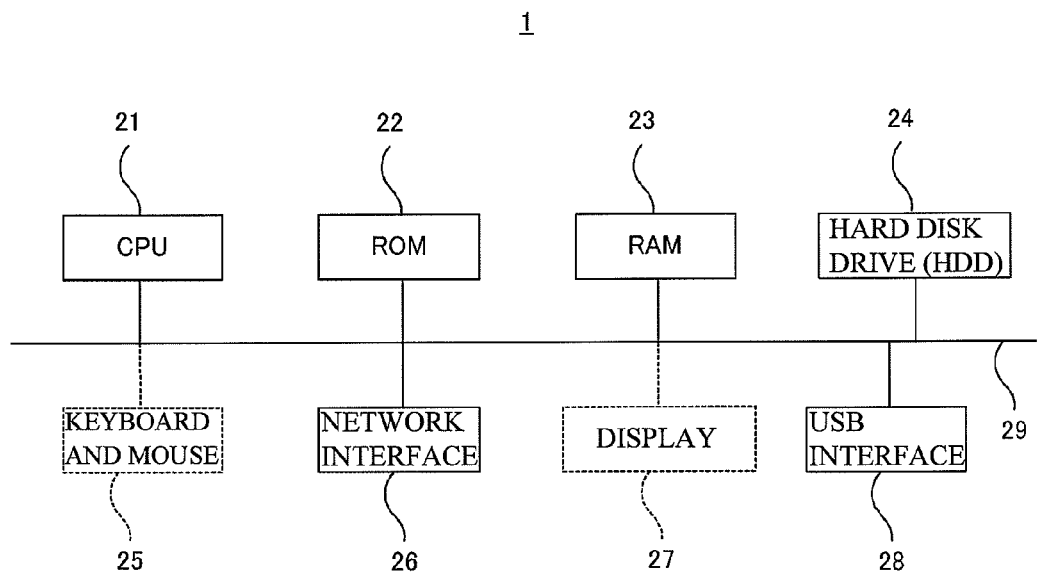
FIG. 3A is a block diagram illustrating the hardware structure of one of the PCs.
Figure 3B:
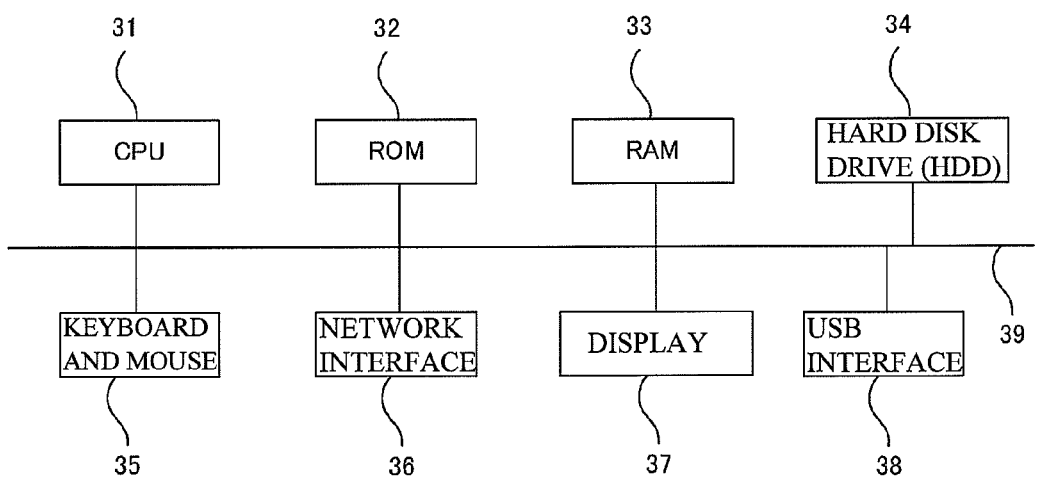
FIG. 3B is a block diagram illustrating the hardware structure of the other one of the PCs.

FIG. 3A is a block diagram showing the hardware structure of the PC 1. FIG. 3B is a block diagram showing the hardware structure of the PC 2.

The PC 1 includes: a CPU 21 that controls the entire device; a ROM 22 that stores control programs; a RAM 23 that functions as a working area; a hard disk drive (HDD) 24 that stores various kinds of information and programs; a network interface 26 that connects to another computer; and a USB (universal serial bus) interface 28 that connects to a USB device (not shown). The CPU 21 is connected to the ROM 22, the RAM 23, the hard disk drive (HDD) 24, the network interface 26, and the USB interface 28 via a system bus 29. The PC 1 is connected to the projector 4, the camera 5, the microphone 10, and the speaker 11 via the USB interface 28. The PC 1 may further include a mouse and keyboard 25 and a display 27.

The controller 101 is equivalent to the CPU 21 that performs various kinds of operations in accordance with control programs. The transmitting and receiving unit 102 is equivalent to the network interface 26, and the memory 103 is equivalent to the hard disk drive (HDD) 24. The interface unit 104 is equivalent to the USB interface 28. The display 105 is equivalent to the display 27, and the operating unit 106 is equivalent to the mouse and keyboard 25.

The PC 2 includes: a CPU 31 that controls the entire device; a ROM 32 that stores control programs; a RAM 33 that functions as a working area; a hard disk drive (HDD) 34 that stores various kinds of information and programs; a mouse and keyboard 35; a network interface 36 that connects to another computer; a display 37 formed with a liquid crystal monitor or a CRT; and a USB (universal serial bus) interface 38 that connects to a USB device (not shown). The CPU 31 is connected to the ROM 32, the RAM 33, the hard disk drive (HDD) 34, the mouse and keyboard 35, the network interface 36, the display 37, and the USB interface 38 via a system bus 39. The PC 2 is connected to the microphone 18 and the speaker 19 via the USB interface 38.

The controller 201 is equivalent to the CPU 31 that performs various kinds of operations in accordance with control programs. The transmitting and receiving unit 202 is equivalent to the network interface 36, and the memory 203 is equivalent to the hard disk drive (HDD) 34. The operating unit 204 is equivalent to the mouse and keyboard 35, and the display 205 is equivalent to the display 37.

FIG. 4 shows an example of a CAD database that is stored in at least one of the memory 103 and the memory 203.

The CAD database stores object IDs that are the identification information for identifying objects such as the object 8, CAD data (the names of files), and attribute information. The attribute information includes the titles, the user names indicating the creators of CAD data, and date data about the creation time and date of the CAD data.

Figure 5:
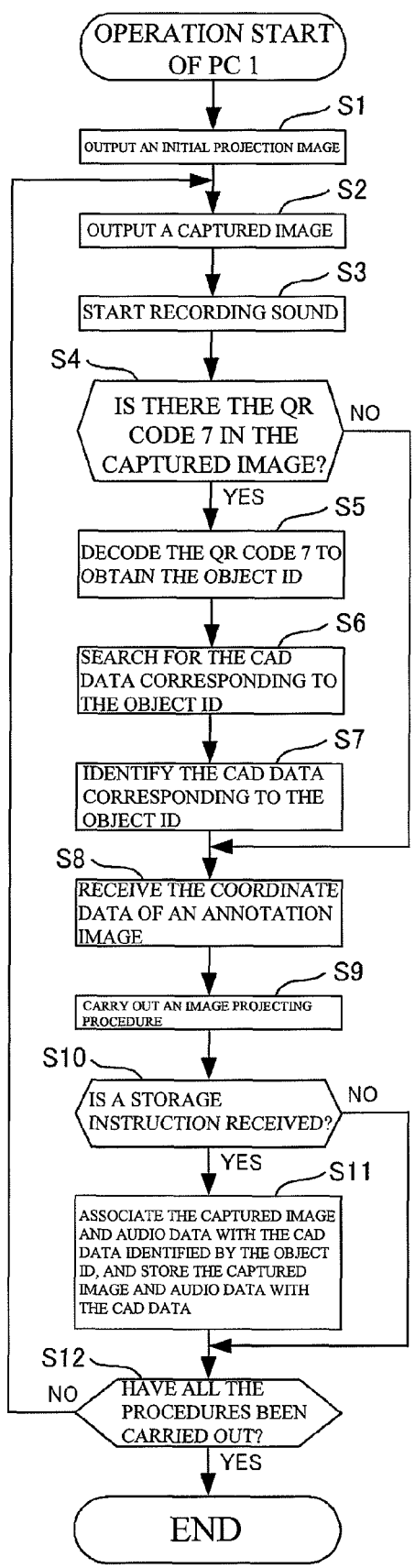
FIG. 5 is a flowchart of an operation to be performed by one of the PCs.

FIG. 5 is a flowchart showing an operation to be performed by the PC 1.

The controller 101 of the PC 1 outputs an initial projection image to the projector 4 (step S1). The initial projection image is a black image.

The controller 101 then outputs an image captured by the camera 5 to the PC 2 via the transmitting and receiving unit 102 and the network 3 (step S2), and starts recording the sound that is input through the microphone 10 and the sound that is output from the speaker 11 (step S3).

The controller 101 then determines whether the image captured by the camera 5 includes the QR code 7 (step S4).

If the determination result of step S4 is "YES", the controller 101 decodes the QR code 7 to obtain the object ID of the object 8 (step S5), and searches the CAD database stored in the memory 103 for the CAD data corresponding to the object ID (step S6). In this manner, the controller 101 identifies the CAD data corresponding to the object ID (step S7). If the determination result of step S4 is "NO", the operation moves on to step S8.

Upon receipt of the coordinate data of an annotation image from the PC 2 through the transmitting and receiving unit 102 (step S8), the controller 101 performs a process for projecting an image in accordance with the coordinate data (step S9). More specifically, the controller 101 decodes and converts the coordinate data of the annotation image to a projection image for the projector 4. The controller 101 outputs the projection image to the projector 4. The projector 4 then projects the projection image, or the annotation image, onto the object 8 and the screen 12.

The controller 101 then determines whether there is a received instruction to store the image captured by the camera 5, the sound that is input through the microphone 10, and the sound that is output through the speaker 11 (step S10). An instruction to store a captured image and sound may be input through the operating unit 106 or the operating unit 204, or may be input by the camera 5 capturing a QR code including an instruction to store a captured image and sound.

If the determination result of step S10 is "NO", the operation moves on to step S12. If the determination result of step S10 is "YES", the controller 101 associates the image captured by the camera 5, the sound input through the microphone 10, and the sound output through the speaker 11 with the CAD data identified by the object ID of the object 8 in step S7, and stores the image and the sound associated with the CAD data into the memory 103 (step S11). If the determination result of step S4 is "NO", the object ID of the object 8 is not found. Therefore, the image captured by the camera 5, the sound input through the microphone 10, and the sound output through the speaker 11 are stored into the memory 103, separately from the CAD data identified in step S7.

To reduce the size of the image captured by the camera 5 to be stored in step S11, the controller 101 may compare the image (still image) captured by the camera 5 with the previous captured image, and determine whether there is a difference greater than a predetermined threshold value. In this case, the controller 101 stores the image captured by the camera 5 into the memory 103, only if the captured image has a difference greater than the threshold value with respect to the previous captured image. For example, in a case where the number of dots forming the image captured by the camera 5 is larger or smaller than the number of dots forming the previous captured image by 100 dots or more, or where the total number of dots forming the image captured by the camera 5 is larger or smaller than the total number of dots forming the previous captured image by 3% or more, the controller 101 determines that there is a difference greater than the predetermined threshold value, and stores the captured image into the memory 103.

Figure 6:
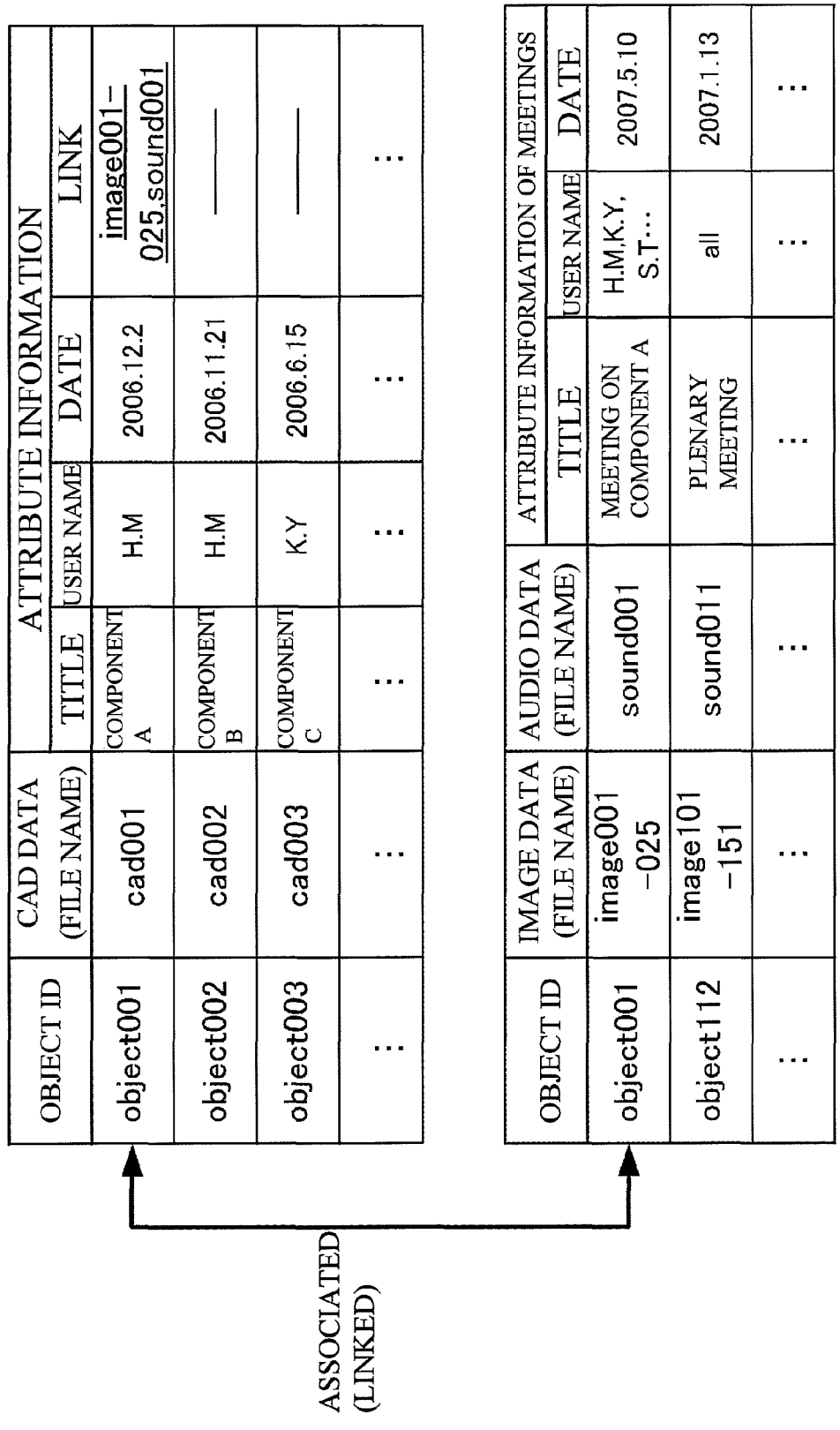
FIG. 6 shows examples of associations between the CAD data and the captured images and audio data.

FIG. 6 shows examples of associations between the CAD data and the captured images and audio data. In FIG. 6, the CAD data having the object ID "object001" and the captured image and audio data having the object ID "object001" are associated with each other, and are stored in the memory 103. The attribute information about the CAD data having the object ID "object001" in FIG. 6 has a link column as well as the items included in the attribution information about the captured image and audio data having the object ID "object001" in FIG. 4. The file names of the associated captured images and audio data are written in the link column. As will be described later, the controller 101 reads and outputs the captured image and audio data associated with the CAD data from the memory 103, when the link to the captured image and audio data included in the attribute information about the CAD data is clicked.

The attribute information added to the captured images and audio data shown in FIG. 6 are attribute information about meetings, and includes the titles, the user names of the meeting participants, and the dates of the meetings.

After step S11, the controller 101 determines whether all the procedures such as the projecting procedure and the image and sound storing procedure have been carried out (step S12). If the determination result of step S12 is "NO", the operation returns to step S2. If the determination result of step S12 is "YES", the operation comes to an end.

Although the controller 101 obtains an object ID through the QR code 7 in steps S4 and S5, the process of obtaining an object ID is not limited to that. For example, the controller 101 may obtain an object ID that is input through the operating unit 106 or the operating unit 204. Also, a RFID tag reader or a barcode reader (not shown) connected to the PC 1 may read a RFID tag or a barcode attached to the object 8, so that the controller 101 obtains the object ID.

Figure 7A:
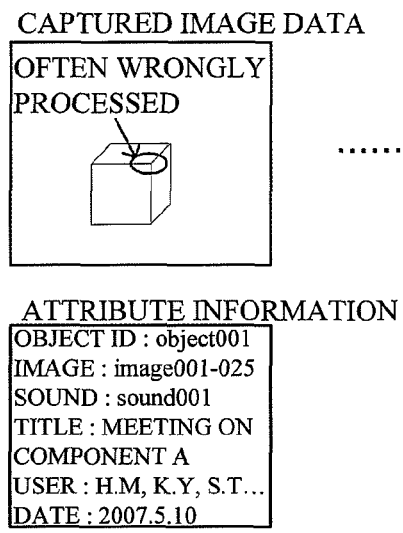
FIG. 7A shows a captured image having an object ID "object001" and its attribute information.
Figure 7B:
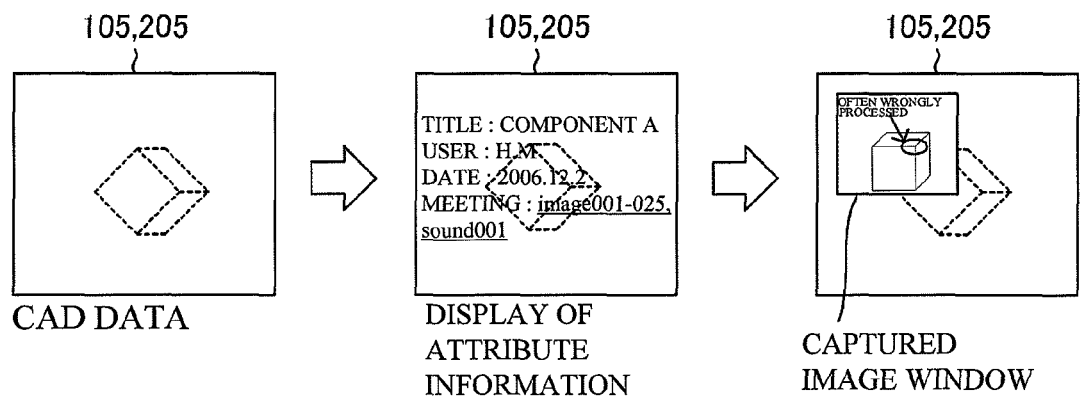
FIG. 7B shows the transitions of the screen of one of the displays.

FIG. 7A shows the captured image having the object ID "object001" and its attribute information. FIG. 7B shows the transitions of the screen of the display 105 or 205.

Through the operation shown in FIG. 5, the captured image shown in FIG. 7A and audio data are stored in the memory 103.

While the application for producing CAD data stored in the memory 103 or 203 is activated, the controller 101 causes the display 105 or 205 to display the CAD data corresponding to the object ID "object001" shown on the left side in FIG. 7B, when the object ID "object001" is input through the operating unit 106 or 204. Further, when an instruction to display the attribute information about the CAD data, the controller 101 causes the display 105 or 205 to display the attribute information about the CAD data, as shown in the center of FIG. 7B. If the link to "image001-025" and "sound001" is clicked through the operating unit 106 or 204 in this situation, the controller 101 causes the display 105 or 205 to display the window showing the captured image on the screen, as shown on the right side in FIG. 7B, and outputs the sound of "sound001" through the speaker 11 or 19. In this manner, when the link to the captured image and audio data included in the attribute information about the CAD data is clicked, the controller 101 reads and outputs the captured image and audio data associated with the CAD data from the memory 103.

As described above in detail, in accordance with this exemplary embodiment, the memory 103 stores the database containing the CAD data used to design the object 8 and their attribute information, and the controller 101 obtains the object ID (identification information) of the object 8. Based on the object ID of the object 8, the controller 101 identifies the CAD data about the object 8 contained in the database. The controller 101 associates the captured image data and the audio data with the CAD data about the object 8, and stores the captured image data and the audio data associated with the CAD data into the memory 103, so that the data of the image captured by the camera 5 and the audio data input and output through the microphone 10 and the speaker 11 can be viewed and listened to, based on the attribute information of the identified CAD data about the object 8.

In this manner, the captured image and audio data about the object 8 obtained through a communication with the PC 2 can be readily viewed and listened to, based on the CAD data of the object 8.

In the first exemplary embodiment, the controller 101 associates captured image data and audio data with identified CAD data of the object, and causes the memory 103 to store the captured image data and audio data with the CAD data. However, it is also possible to associate only the captured image data with the identified CAD data of the object, and cause the memory 103 to store the captured image associated with the CAD data. In such a case, the captured image data about the object 8 obtained through a communication with the PC 2 can be readily viewed, based on the CAD data of the object 8. Also, the controller 101 (the data converter) may convert the audio data into text data by a known technique. The controller 101 then associates the captured image data and text data with the identified CAD data of the object, and causes the memory 103 to store the captured image data and the text data associated with the CAD data. In this manner, the captured image and the text data corresponding to the audio data about the object 8 obtained through a communication with the PC 2 can be readily viewed, based on the CAD data of the object 8.

Furthermore, in a case where the object 8 is measured with the use of various measurement devices (such as a size measuring machine, a thermometer, a hydrometer, and an ammeter), the controller 101 may associate the data obtained through those measurement devices with the CAD data of the object, and cause the memory 103 to store the measurement data and the CAD data.

Second Exemplary Embodiment

In the first exemplary embodiment, the CAD data is associated with a captured image and audio data, and the associated image and data are stored in the memory 103. In this exemplary embodiment, on the other hand, CAD data is associated with a captured image and audio data, and the associated image and data are stored in the memory 203.

In the first exemplary embodiment, the CAD database is stored beforehand in the memory 103. In this exemplary embodiment, on the other hand, the CAD database shown in FIG. 4 is stored beforehand in the memory 203.

Figure 8:
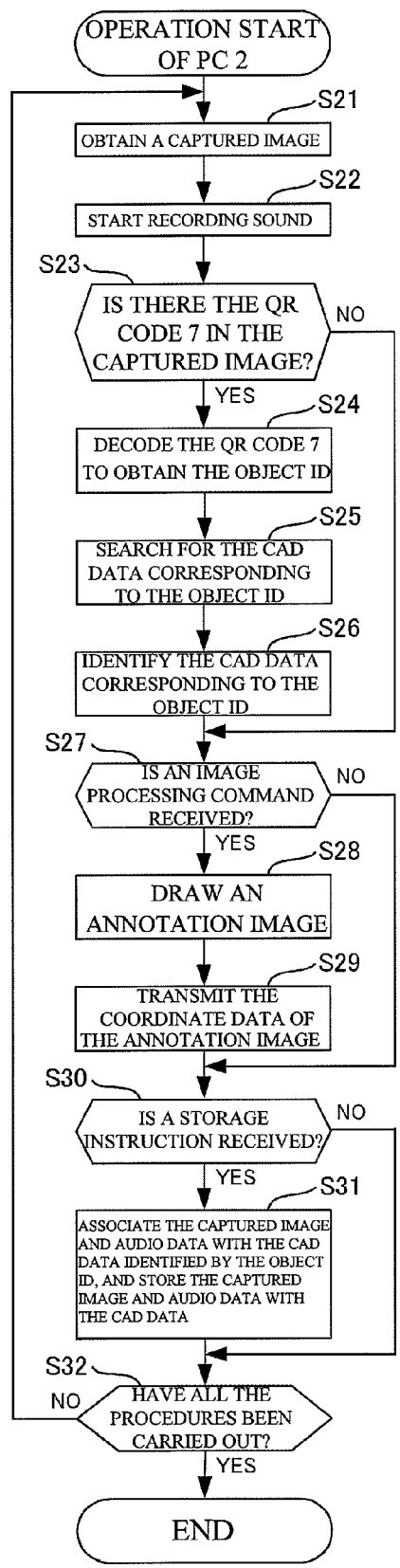
FIG. 8 is a flowchart of an operation to be performed by the other one of the PCs in accordance with a second exemplary embodiment.

FIG. 8 is a flowchart of an operation to be performed by the PC 2.

The controller 201 obtains a captured image from the PC 1 (step S21), and starts recording the sound that is input through the microphone 18 and the sound that is output from the speaker 19 (step S22).

The controller 201 then determines whether the captured image includes the QR code 7 (step S23).

If the determination result of step S23 is "YES", the controller 201 decodes the QR code 7 to obtain the object ID of the object 8 (step S24), and searches the CAD database stored in the memory 203 for the CAD data corresponding to the object ID (step S25). In this manner, the controller 101 identifies the CAD data corresponding to the object ID (step S26). If the determination result of step S23 is "NO", the operation moves on to step S27.

The controller 201 then determines whether a screen process command to draw an annotation image has been received through the operating unit 204 (step S27).

If the determination result of step S27 is "NO", the operation moves on to step S30. If the determination result of step S27 is "YES", the controller 201 draws the annotation image on the display region 15 in accordance with the screen process command (step S28), and transmits the coordinate data of the annotation image to the PC 1 through the transmitting and receiving unit 202 (step S29) The coordinate data transmitted to the PC 1 is received by the controller 101 through the transmitting and receiving unit 102 in step S8 of FIG. 5.

The controller 201 then determines whether an instruction to store the captured image, the sound input through the microphone 18, and the sound output through the speaker 19 has been received (step S30). The instruction to store the captured image and the sound may be input through the operating unit 106 or the operating unit 204, or may be input by the camera 5 capturing the QR code including the instruction to store the captured image and the sound.

If the determination result of step S30 is "NO", the operation moves on to step S32. If the determination result of step S30 is "YES", the associates the captured image, the sound input through the microphone 18, and the sound output through the speaker 19 with the CAD data identified by the object ID of the object 8 in step S26, and stores the image and the sound associated with the CAD data into the memory 203 (step S31). If the determination result of step S23 is "NO", the object ID of the object 8 is not found. Therefore, the captured image, the sound input through the microphone 18, and the sound output through the speaker 19 are stored into the memory 203, separately from the CAD data identified in step S26.

To reduce the size of the image captured by the camera 5 to be stored in step S31, the controller 201 may compare the captured image (still image) with the previous captured image, and determine whether there is a difference greater than a predetermined threshold value. In this case, the controller 201 stores the captured image into the memory 203, only if the captured image has a difference greater than the threshold value with respect to the previous captured image. For example, in a case where the number of dots forming the captured image is larger or smaller than the number of dots forming the previous captured image by 100 dots or more, or where the total number of dots forming the captured image is larger or smaller than the total number of dots forming the previous captured image by 3% or more, the controller 201 determines that there is a difference greater than the predetermined threshold value, and stores the captured image into the memory 203.

After step S31, the controller 201 determines whether all the procedures such as the transmission of the coordinate data of the annotation image and the image and sound storing procedure have been carried out (step S32). If the determination result of step S32 is "NO", the operation returns to step S12. If the determination result of step S32 is "YES", the operation comes to an end.

Although the controller 201 obtains an object ID through the QR code 7 in steps S23 and S24, the process of obtaining an object ID is not limited to that. For example, the controller 201 may obtain an object ID that is input through the operating unit 106 or the operating unit 204. Also, the controller 201 may obtain an object ID that is input directly from the PC 1.

Like the controller 101 explained with reference to FIGS. 7A and 7B, when the link to the captured image and audio data included in the attribute information about the CAD data is clicked, the controller 201 reads and outputs the captured image and audio data associated with the CAD data from the memory 203.

As described above in detail, in accordance with this exemplary embodiment, the memory 203 stores the database containing the CAD data used to design the object 8 and their attribute information, and the controller 201 obtains the object ID (identification information) of the object 8. Based on the object ID of the object 8, the controller 201 identifies the CAD data about the object 8 contained in the database. The controller 201 associates the captured image data and the audio data with the CAD data about the object 8, and stores the captured image data and the audio data associated with the CAD data into the memory 203, so that the data of the image captured by the camera 5 and the audio data input and output through the microphone 18 and the speaker 19 can be viewed and listened to, based on the attribute information of the identified CAD data about the object 8.

In this manner, the captured image and audio data about the object 8 obtained through a communication with the PC 1 can be readily viewed and listened to, based on the CAD data of the object 8.

In the second exemplary embodiment, the controller 201 associates captured image data and audio data with identified CAD data of the object, and causes the memory 203 to store the captured image data and audio data with the CAD data. However, it is also possible to associate only the captured image data with the identified CAD data of the object, and cause the memory 203 to store the captured image associated with the CAD data. In such a case, the captured image data about the object 8 obtained through a communication with the PC 1 can be readily viewed, based on the CAD data of the object 8. Also, the controller 201 (the data converter) may convert the audio data into text data by a known technique. The controller 201 then associates the captured image data and text data with the identified CAD data of the object, and causes the memory 203 to store the captured image data and the text data associated with the CAD data. In this manner, the captured image and the text data corresponding to the audio data about the object 8 obtained through a communication with the PC 1 can be readily viewed, based on the CAD data of the object 8.

Furthermore, in a case where the object 8 is measured with the use of various measurement devices (such as a size measuring machine, a thermometer, a hydrometer, and an ammeter), the controller 201 may associate the data obtained through those measurement devices with the CAD data of the object, and cause the memory 203 to store the measurement data and the CAD data.

Third Exemplary Embodiment

In the first exemplary embodiment, the controller 101 associates the CAD data corresponding to the object ID of the object 8 with the captured image and audio data of the object 8, and stores the CAD data associated with the captured image and audio data into the memory 103. In cases where the object 8 is a component of a completed product and the object 8 is redesigned with the use of CAD data, operators might wish to refer not only to the captured image and audio data about the object 8 but also to the captured images and audio data about other components related to the object 8. With such cases being taken into consideration in this exemplary embodiment, the controller 101 associates the CAD data corresponding to the object ID of the object 8 with the captured images and audio data of the object 8 and the other objected related to the object 8, and stores the CAD data associated with the captured images and audio data into the memory 103.

Figure 9:
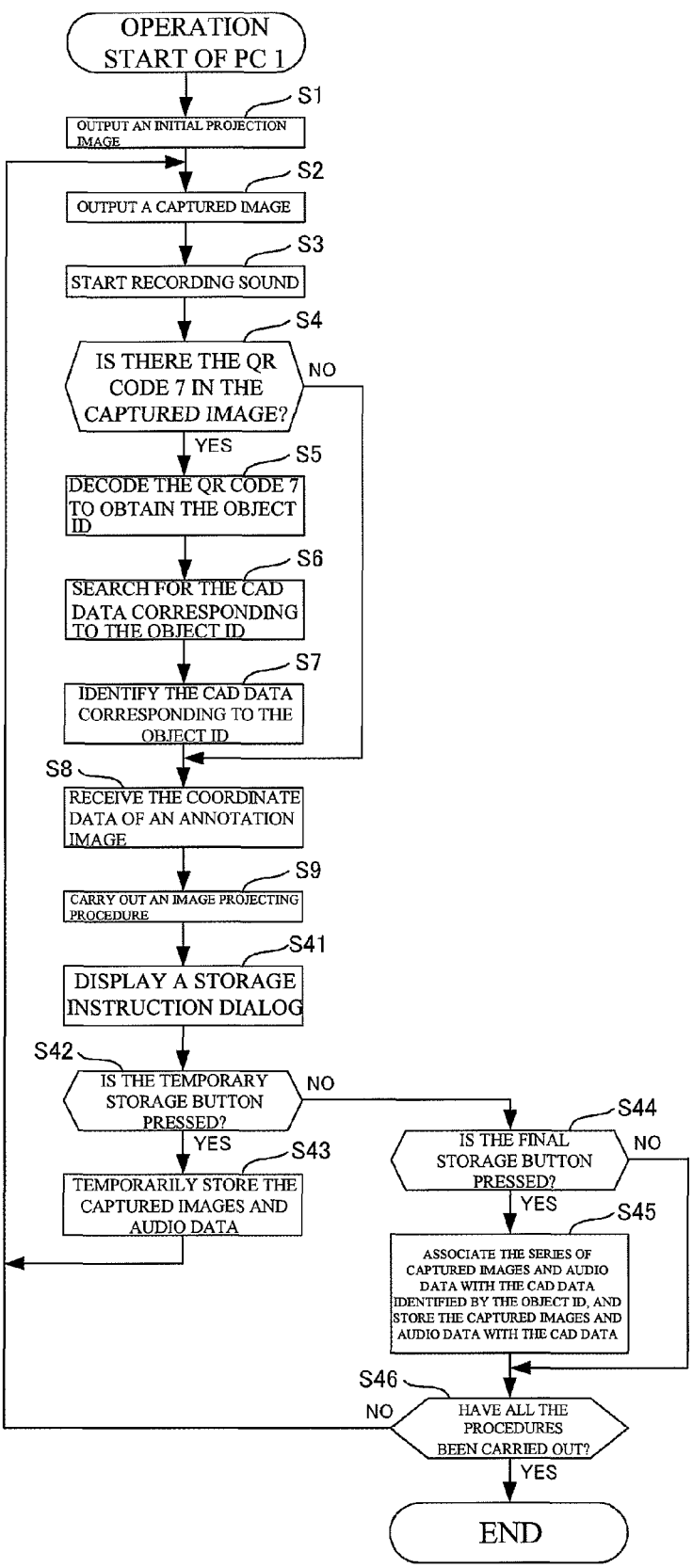
FIG. 9 is a flowchart of an operation to be performed by one of the PCs in accordance with a third exemplary embodiment.

FIG. 9 is a flowchart of an operation to be performed by the PC 1. In FIG. 9, the same procedures as those of FIG. 5 are denoted by the same step numbers as those of FIG. 5, and explanation of them is omitted here.

In the following description, an image of the object 8 is first captured, and after that, images of other components related to the object 8 are captured.

After step S9, the controller 101 displays a storage instruction dialog on the display 105 or 205 (step S41).

Figure 10A:
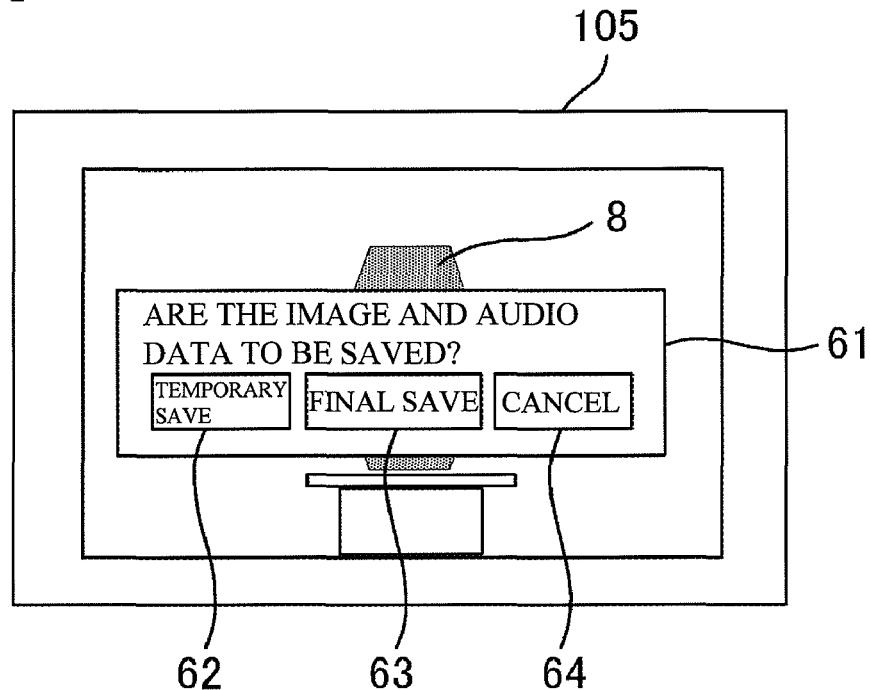
FIG. 10A shows an example of a display that displays a dialog of a storage instruction.
Figure 10B:
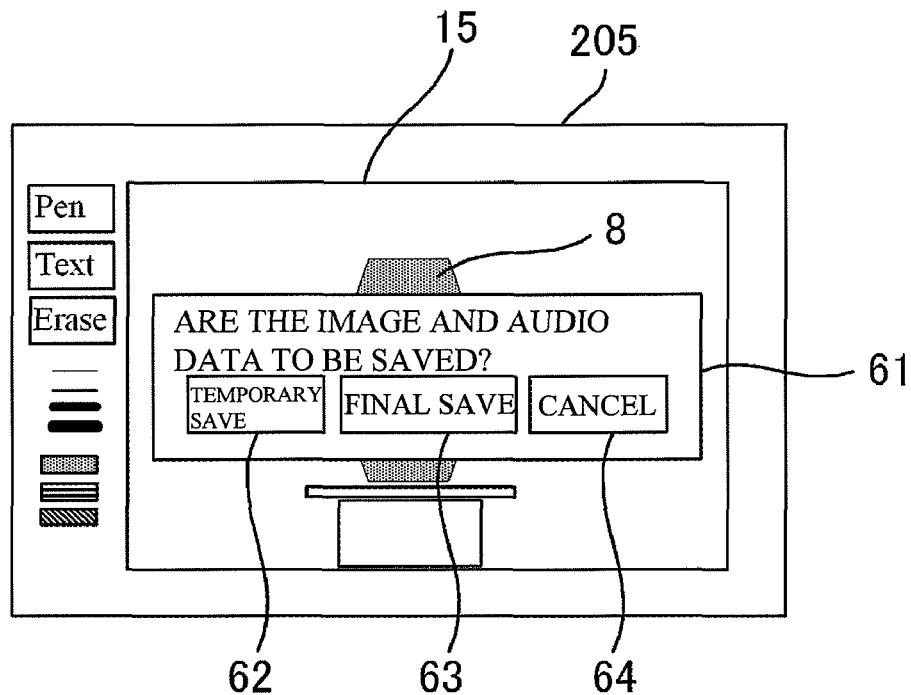
FIG. 10B shows an example of a display that displays the dialog of a storage instruction.

FIG. 10A shows an example of the display 105 displaying a storage instruction dialog 61. FIG. 10B shows an example of the display 205 displaying the storage instruction dialog 61.

The storage instruction dialog 61 includes: a temporary storage button 62 for temporarily storing the captured image and audio data of each object into the memory 103; a final storage button 63 for storing finally the captured images and audio data of the object 8 and the other objects related to the object 8 into the memory 103; and a cancel button 64.

Referring back to FIG. 9, the controller 101 determines whether the temporary storage button 62 is pressed through the operating unit 106 or the operating unit 204 (step S42).

If the determination result of step S42 is "YES", the controller 101 temporarily stores the captured images and audio data into the memory 103 (step S32), and returns to step S2. If the controller 101 returns to step S2 from step S43, the controller 101 switches to another sound recording file, and starts recording sound. If the controller 101 returns to step S2 from step S43, images of objects other than the object 8 can be captured.

If the determination result of step S42 is "NO", the controller 101 determines whether the final storage button 63 is pressed through the operating unit 106 or the operating unit 204 (step S44).

If the determination result of step S44 is "NO", or when the cancel button 64 is pressed, the operation moves on to step S46.

If the determination result of step S44 is "YES", the controller 101 associates the image being currently captured and the audio data, and the captured images and the audio data temporarily stored in the memory 103 with the CAD data of the object 8 first identified by the object ID of the object 8 in step S7, and stores the images and the audio data associated with the CAD data into the memory 103 (step S45). If the determination result of step S4 is "NO", the object ID of the object 8 is not found. Therefore, the captured images and the audio data are stored into the memory 103, separately from the CAD data of the object 8 identified in step S7.

To reduce the amount of the captured image data temporarily to be stored in step S43 and the amount of the captured image data to be finally stored in step S45, the controller 101 may compare the image (still image) captured by the camera 5 with the previous captured image, and determine whether there is a difference greater than a predetermined threshold value. In this case, the controller 101 stores the captured image into the memory 103, only if the captured image has a difference greater than the threshold value with respect to the previous captured image. For example, in a case where the number of dots forming the image captured by the camera 5 is larger or smaller than the number of dots forming the previous captured image by 100 dots or more, or where the total number of dots forming the image captured by the camera 5 is larger or smaller than the total number of dots forming the previous captured image by 3% or more, the controller 101 determines that there is a difference greater than the predetermined threshold value, and stores the captured image into the memory 103.

Figure 11:
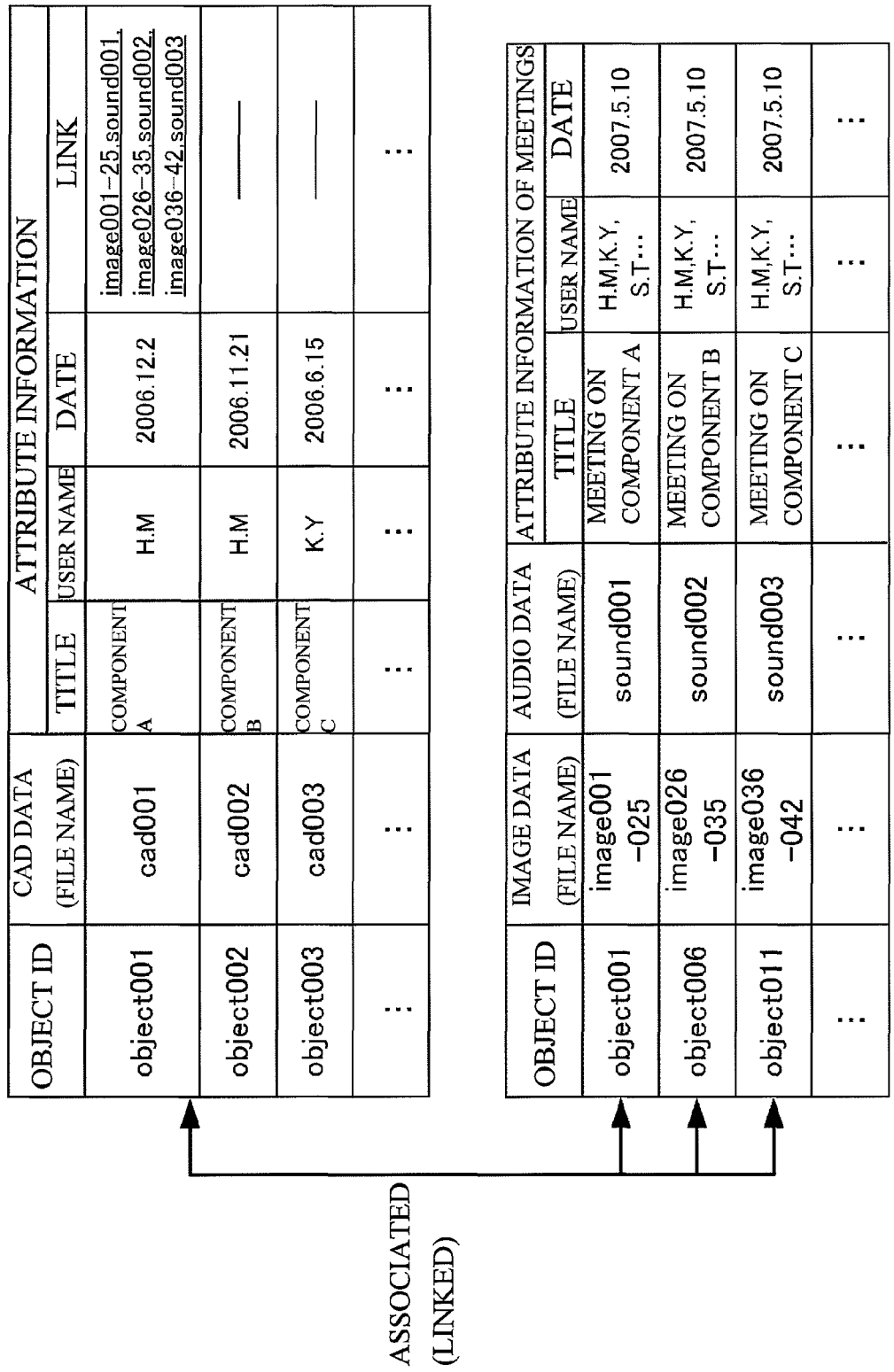
FIG. 11 shows an example case where one set of CAD data is associated with two or more captured images and audio data.

FIG. 11 shows an example case where one set of CAD data is associated with two or more captured images and two or more sets of audio data. In FIG. 11, the CAD data having the object ID "object001" is associated with two or more captured images and two or more sets of audio data, and are stored in the memory 103. The attribute information about the CAD data having the object ID "object001" in FIG. 11 has a link column as well as the items included in the attribution information about the CAD data having the object ID "object001" in FIG. 4. The file names of the associated captured images and audio data are written in the link column. The controller 101 reads and outputs the captured images and audio data associated with the CAD data from the memory 103, when the link to the captured images and audio data included in the attribute information about the CAD data is clicked.

The attribute information added to the captured images and audio data shown in FIG. 11 are attribute information about meetings, and includes the titles, the user names of the meeting participants, and the dates of the meetings.

After step S45, the controller 101 determines whether all the procedures such as the projecting procedure and the image and sound storing procedure have been carried out (step S46). If the determination result of step S46 is "NO", the operation returns to step S2. If the determination result of step S46 is "YES", the operation comes to an end.

In steps S41 through S45, the controller 101 displays the storage instruction dialog on the display 105 or the display 205, and determines whether the temporary storage button 62 or the final storage button 63 is pressed. However, the controller 101 may determine whether the temporary button 62 or the final storage button 63 is pressed, based on whether a predetermined key input (Alt+F1, for example) corresponding to the temporary storage button 62 or a predetermined key input (Alt+F2, for example) corresponding to the final storage button 63 is made.

In step S45, the controller 101 associates the image being currently captured and the audio data, and the captured images and the audio data temporarily stored in the memory 103 with the CAD data of the object 8 first identified by the object ID of the object 8 in step S7, and stores the images and the audio data associated with the CAD data into the memory 103. However, the controller 101 may associate the image being currently captured and the audio data, and the captured images and the audio data temporarily stored in the memory 103 with the CAD data of the object 8 last identified by the object ID of the object 8 in step S7, and stores the images and the audio data associated with the CAD data into the memory 103.

Figure 12:
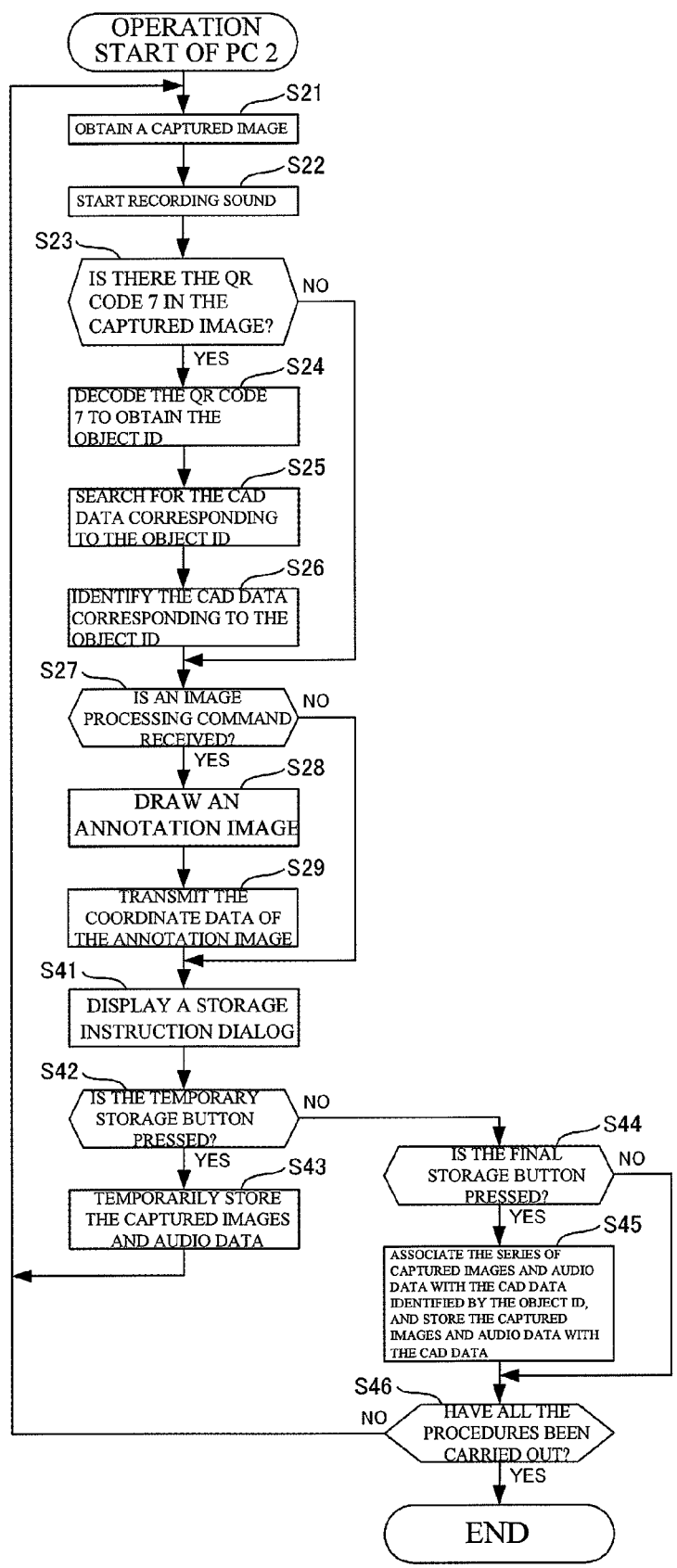
FIG. 12 is a flowchart of an operation to be performed by the other one of the PCs in accordance with the third exemplary embodiment.

As shown in FIG. 12, the procedures of steps S41 through S46 may be added to the procedures of steps S21 through S29. By doing so, the controller 201 of the PC 2 can associate the CAD data corresponding to the object ID of the object 8 with the captured images and audio data of the object 8 and the other objects related to the object 8, and store the captured images and audio data associated with the CAD data into the memory 203.

As described above in detail, in accordance with this exemplary embodiment, in a case where an image of each of the objects is captured and the audio data files are switched when the objects are switched, the controller 101 associates the captured image data and the audio data of the objects with the first or last identified CAD data about the object 8, and stores the captured image data and the audio data associated with the CAD data into the memory 103, so that the images of the objects captured by the camera 5 and the two or more sets of audio data input and output through the microphone 10 and the speaker 11 can be viewed and listened to, based on the attribute information of the first or last identified CAD data of the object 8.

In this manner, based on the first or last identified CAD data about the object 8, the captured images and audio data about objects including the object 8 obtained through a communication with the PC 2 can be readily viewed and listened to.

Likewise, in a case where an image of each of the objects is captured and the audio data files are switched when the objects are switched, the controller 201 associates the captured image data and the audio data of the objects with the first or last identified CAD data about the object 8, and stores the captured image data and the audio data associated with the CAD data into the memory 203, so that the images of the objects captured by the camera 5 and the two or more sets of audio data input and output through the microphone 18 and the speaker 19 can be viewed and listened to, based on the attribute information of the first or last identified CAD data of the object 8.

In this manner, based on the first or last identified CAD data about the object 8, the captured images and audio data about objects including the object 8 obtained through a communication with the PC 1 can be readily viewed and listened to.

When the temporary storage button 62 is pressed, the controller 101 or the controller 201 causes the memory 103 or the memory 203 to temporarily store the captured image data about each object and the audio data about each object. When the final storage button 63 is pressed, the controller 101 or the controller 201 associates the captured image data of the objects and the two or more sets of audio data with the first or last identified CAD data of the object 8, and causes the memory 103 or the memory 203 to store the captured image data and the audio data of the objects associated with the CAD data, so that the images of the objects captured by the camera 5 and the two or more sets of audio data input and output through the microphone 10 and the speaker 11 or the microphone 18 and the speaker 19 can be viewed and listened to, based on the attribute information of the first or last identified CAD data of the object 8.

Accordingly, when the temporary storage button 62 is pressed, the captured image and audio data of each object are temporarily stored into the memory 103 or the memory 203. When the final storage button 63 is pressed, the captured images and audio data of the objects including the temporarily stored captured images and audio data are associated with the first or last identified CAD data of the object 8, and can be stored into the memory 103 or the memory 203.

In the third exemplary embodiment, the controller 101 or the controller 201 associates captured image data and audio data with identified CAD data of the object 8, and causes the memory 103 or the memory 203 to store the captured image data and audio data associated with the CAD data. However, it is also possible to associate only the captured image data with the identified CAD data of the object 8, and cause the memory 103 or the memory 203 to store the captured images associated with the CAD data. In such a case, the captured image data about the object 8 obtained through a communication with the PC 2 or the PC 1 can be readily viewed, based on the CAD data of the object 8. Also, the controller 101 or the controller 201 (the data converter) may convert the audio data into text data by a known technique. The controller 101 or the controller 201 then associates the captured image data and text data with the identified CAD data of the object 8, and causes the memory 103 or the memory 203 to store the captured image data and the text data associated with the CAD data. In this manner, the captured images and the text data corresponding to the audio data about the object 8 obtained through a communication with the PC 2 or the PC 1 can be readily viewed, based on the CAD data of the object 8.

Furthermore, in a case where the object 8 is measured with the use of various measurement devices (such as a size measuring machine, a thermometer, a hydrometer, and an ammeter), the controller 101 or the controller 201 may associate the data obtained through those measurement devices with the CAD data of the object, and cause the memory 103 or the memory 203 to store the measurement data and the CAD data.

Alternatively, a recording medium having the software program for realizing the functions of the PC 1 and the PC 2 recorded thereon may be provided to each PC, and the CPU of each PC may read and execute the program recorded on the recording medium. In this manner, the same effects as those of the above-described exemplary embodiments can be achieved. The recording medium for supplying the program may be a CD-ROM, a DVD, a SD card, or the like.

Also, the CPU of each PC may execute the software program for realizing the functions of each PC. In this manner, the same effects as those of the above-described exemplary embodiments can also be achieved.

It should be understood that the present invention is not limited to the above-described exemplary embodiments, and various modifications may be made to them without departing from the scope of the invention.

What is claimed is:

1. An information processing device that is connected to a projecting device that projects an annotation image input from an external terminal onto a projection region including an object, and is connected to an image capturing device that captures an image of the projection region, the information processing device obtaining image data to be input to and output from the projecting device and the image capturing device through a communication with the external terminal,
the information processing device comprising:
a memory that stores a database including CAD data to be used for designing the object, and attribute information thereof;
an acquiring unit that acquires identification information of the object;
an identifying unit that identifies the CAD data of the object included in the database, based on the acquired identification information of the object; and
a controller that associates data of an image captured by the image capturing device with the CAD data of the object identified by the identifying unit, and causes the memory to store the data of the captured image associated with the CAD data, so that the data of the captured image can be viewed based on the attribute information of the CAD data of the object identified by the identifying unit.

2. The information processing device as claimed in claim 1, wherein:
the information processing device is connected to an audio input and output device that inputs sound to the external terminal and outputs sound from the external terminal, and obtains data of the sound through a communication with the external terminal; and
the controller associates the data of the captured image and the audio data with the CAD data of the object identified by the identifying unit, and causes the memory to store the data of the captured image and the audio data associated with the CAD data, so that the data of the image captured by the image capturing device and the audio data input through the audio input and output device can be viewed and listened to, based on the attribute information of the CAD data of the object identified by the identifying unit.

3. The information processing device as claimed in claim 2, further comprising
a data converter that converts the audio data into text data,
wherein the controller associates the data of the captured image and the text data with the CAD data of the object identified by the identifying unit, and causes the memory to store the data of the captured image and the text data associated with the CAD data, so that the data of the image captured by the image capturing device and the text data converted by the data converter can be viewed, based on the attribute information of the CAD data of the object identified by the identifying unit.

4. An information processing device that communicates with a server connected to a projecting device that projects an annotation image onto a projection region including an object and to an image capturing device that captures an image of the projection region, the information processing device obtaining image data to be input to and output from the projecting device and the image capturing device through a communication with the server,
the information processing device comprising:
a memory that stores a database including CAD data to be used for designing the object, and attribute information thereof;
an acquiring unit that acquires identification information of the object;
an identifying unit that identifies the CAD data of the object included in the database, based on the acquired identification information of the object; and
a controller that associates data of an image captured by the image capturing device with the CAD data of the object identified by the identifying unit, and causes the memory to store the data of the captured image associated with the CAD data, so that the data of the captured image can be viewed based on the attribute information of the CAD data of the object identified by the identifying unit.

5. The information processing device as claimed in claim 4, wherein:
a first audio input and output device that inputs and outputs sound is connected to the information processing device;
a second audio input and output device that inputs and outputs sound is connected to the server;
audio data of the sound is obtained through a communication between the information processing device and the server; and
the controller associates the data of the captured image and the audio data with the CAD data of the object identified by the identifying unit, and causes the memory to store the data of the captured image and the audio data associated with the CAD data, so that the data of the image captured by the image capturing device and the audio input or output through the first audio input and output device can be viewed and listened to, based on the attribute information of the CAD data of the object identified by the identifying unit.

6. The information processing device as claimed in claim 5, further comprising
a data converter that converts the audio data input or output through the first audio input and output device into text data,
wherein the controller associates the data of the captured image and the text data with the CAD data of the object identified by the identifying unit, and causes the memory to store the data of the captured image and the text data associated with the CAD data, so that the data of the image captured by the image capturing device and the text data converted by the data converter can be viewed, based on the attribute information of the CAD data of the object identified by the identifying unit.

7. The information processing device as claimed in claim 1, wherein, when images of a plurality of objects are captured one by one, the controller associates data of the plurality of images captured by the image capturing device with the CAD data of the object first or last identified by the identifying unit, and causes the memory to store the data of the captured images associated with the CAD data, so that the data of the captured images can be viewed based on the attribute information of the CAD data of the object first or last identified by the identifying unit.

8. The information processing device as claimed in claim 2, wherein, when images of a plurality of objects are captured one by one and audio data files are switched at the time of switching the objects, the controller associates data of the plurality of images captured by the image capturing device and a plurality of sets of audio data input or output through the audio input and output device with the CAD data of the object first or last identified by the identifying unit, and causes the memory to store the data of the captured images and the audio data associated with the CAD data, so that the data of the captured images and the plurality of sets of audio data can be viewed and listened to, based on the attribute information of the CAD data of the object first or last identified by the identifying unit.

9. The information processing device as claimed in claim 8, further comprising
an input unit that is used to input a temporary storage instruction or a final storage instruction,
wherein:
when the temporary storage instruction is input through the input unit, the controller causes the memory to temporarily store the captured image data of each of the objects and the audio data of each of the objects; and
when the final storage instruction is input through the input unit, the controller associates the data of the plurality of images captured by the image capturing device and the plurality of sets of audio data input or output through the audio input and output device with the CAD data of the object first or last identified by the identifying unit, and causes the memory to store the data of the captured images and the audio data associated with the CAD data, so that the data of the captured images and the plurality of sets of audio data can be viewed and listened to, based on the attribute information of the CAD data of the object first or last identified by the identifying unit.

10. An information processing method performed by a computer for processing information, the computer being connected to a projecting device that projects an annotation image input from an external terminal onto a projection region including an object, the computer being also connected to an image capturing device that captures an image of the projection region, the computer obtaining image data to be input to and output from the projecting device and the image capturing device through a communication with the external terminal,
the method comprising:
storing a database including CAD data to be used for designing the object, and attribute information thereof;
acquiring identification information of the object;
identifying the CAD data of the object included in the database, based on the acquired identification information of the object; and
associating data of an image captured by the image capturing device with the CAD data of the object identified by the identifying unit, and causing the memory to store the data of the captured image associated with the CAD data, so that the data of the captured image can be viewed based on the attribute information of the CAD data of the object identified by the identifying unit.

11. An information processing method performed by a computer for processing information, the computer communicating with a server connected to a projecting device that projects an annotation image onto a projection region including an object and to an image capturing device that captures an image of the projection region, the information processing device obtaining image data to be input to and output from the projecting device and the image capturing device through a communication with the server,
the method comprising:
storing a database including CAD data to be used for designing the object, and attribute information thereof;
acquiring identification information of the object;
identifying the CAD data of the object included in the database, based on the acquired identification information of the object; and
associating data of an image captured by the image capturing device with the CAD data of the object identified by the identifying unit, and causing the memory to store the data of the captured image associated with the CAD data, so that the data of the captured image can be viewed based on the attribute information of the CAD data of the object identified by the identifying unit.

12. A non-transitory computer readable medium storing a program causing a computer to execute a process for processing information, the computer being connected to a projecting device that projects an annotation image input from an external terminal onto a projection region including an object, the computer being also connected to an image capturing device that captures an image of the projection region, the computer obtaining image data to be input to and output from the projecting device and the image capturing device through a communication with the external terminal,
the process comprising:
storing a database including CAD data to be used for designing the object, and attribute information thereof;
acquiring identification information of the object;
identifying the CAD data of the object included in the database, based on the acquired identification information of the object; and
associating data of an image captured by the image capturing device with the CAD data of the object identified by the identifying unit, and causing the memory to store the data of the captured image associated with the CAD data, so that the data of the captured image can be viewed based on the attribute information of the CAD data of the object identified by the identifying unit.

13. A non-transitory computer readable medium storing a program causing a computer to execute a process for processing information, the computer communicating with a server connected to a projecting device that projects an annotation image onto a projection region including an object and to an image capturing device that captures an image of the projection region, the information processing device obtaining image data to be input to and output from the projecting device and the image capturing device through a communication with the server,
the process comprising:
storing a database including CAD data to be used for designing the object, and attribute information thereof;
acquiring identification information of the object;

identifying the CAD data of the object included in the database, based on the acquired identification information of the object; and associating data of an image captured by the image capturing device with the CAD data of the object identified by the identifying unit, and causing the memory to store the data of the captured image associated with the CAD data, so that the data of the captured image can be viewed based on the attribute information of the CAD data of the object identified by the identifying unit.

* * * * *